United States Patent [19]

Osborne et al.

[11] Patent Number: 5,545,967
[45] Date of Patent: Aug. 13, 1996

[54] AUTOMATIC BATTERY MANAGEMENT SYSTEM

[75] Inventors: Robert E. Osborne, Coral Springs; David A. Garlow, Boca Raton, both of Fla.

[73] Assignee: Precision Automation Systems, Inc., Miami, Fla.

[21] Appl. No.: 505,110

[22] Filed: Jul. 21, 1995

[51] Int. Cl.$^6$ .............................. H02J 7/00; B65G 67/00
[52] U.S. Cl. .................................................. 320/2; 104/34
[58] Field of Search ........................ 320/2, 15; 104/34; 429/54

[56] References Cited

U.S. PATENT DOCUMENTS

| | | | |
|---|---|---|---|
| 3,630,788 | 8/1969 | Henen | 429/77 |
| 3,880,209 | 4/1975 | Haughn et al. | 141/95 |
| 3,957,093 | 5/1976 | Stoner | 141/209 |
| 4,227,463 | 10/1980 | Pfleger | 104/34 |
| 4,334,819 | 6/1982 | Hammerslag | 104/34 X |
| 4,499,424 | 2/1985 | Rowlette | 324/427 |
| 4,583,286 | 4/1986 | Schaumburg et al. | 29/730 |
| 4,983,903 | 1/1991 | Bae et al. | 320/2 |
| 5,091,687 | 2/1992 | Meyer et al. | 320/2 |
| 5,132,176 | 7/1992 | Valentine et al. | 429/54 |

*Primary Examiner*—Peter S. Wong
*Assistant Examiner*—K. Shin
*Attorney, Agent, or Firm*—James H. Beusse

[57] ABSTRACT

A system for automatic loading, unloading and charging of rechargeable batteries used in battery electric traction motor powered vehicles comprises a battery recharge station, a battery load and unload station adapted for positioning a battery powered vehicle in a preselected position, and a programmable battery transport apparatus programmed for automatically removing discharged batteries from the vehicle, transporting the discharged batteries to a battery recharge station, unloading the discharged batteries into the recharge station, retrieving charged batteries from the recharge station, transporting the charged batteries to the vehicle and loading the charged batteries onto the vehicle. The system may also include a battery water check station, the transport apparatus being programmed to transport batteries from the battery charging station to the water check station, load the charged batteries into the water check station and unload the batteries from the water check station upon completion of a check of the water level in each of the batteries by the water check station. The check station utilizes an elongate probe adapted for insertion into each cell of the battery through a cap positioned on the cell, the cap comprising a pair of elastomeric members having oppositely facing concave portions, each of the concave portions including a centrally positioned cut for allowing passage therethrough of the probe.

14 Claims, 5 Drawing Sheets

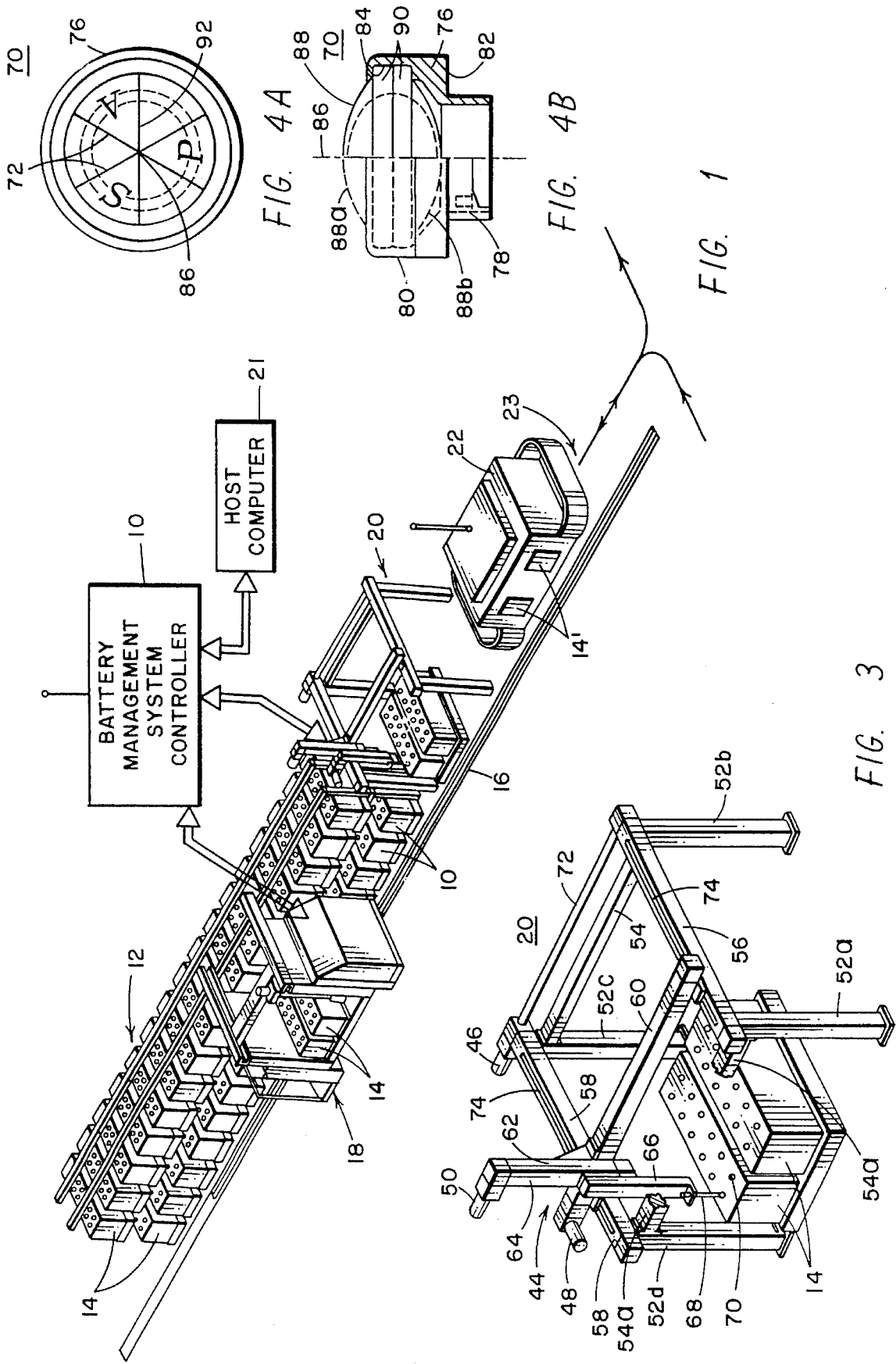

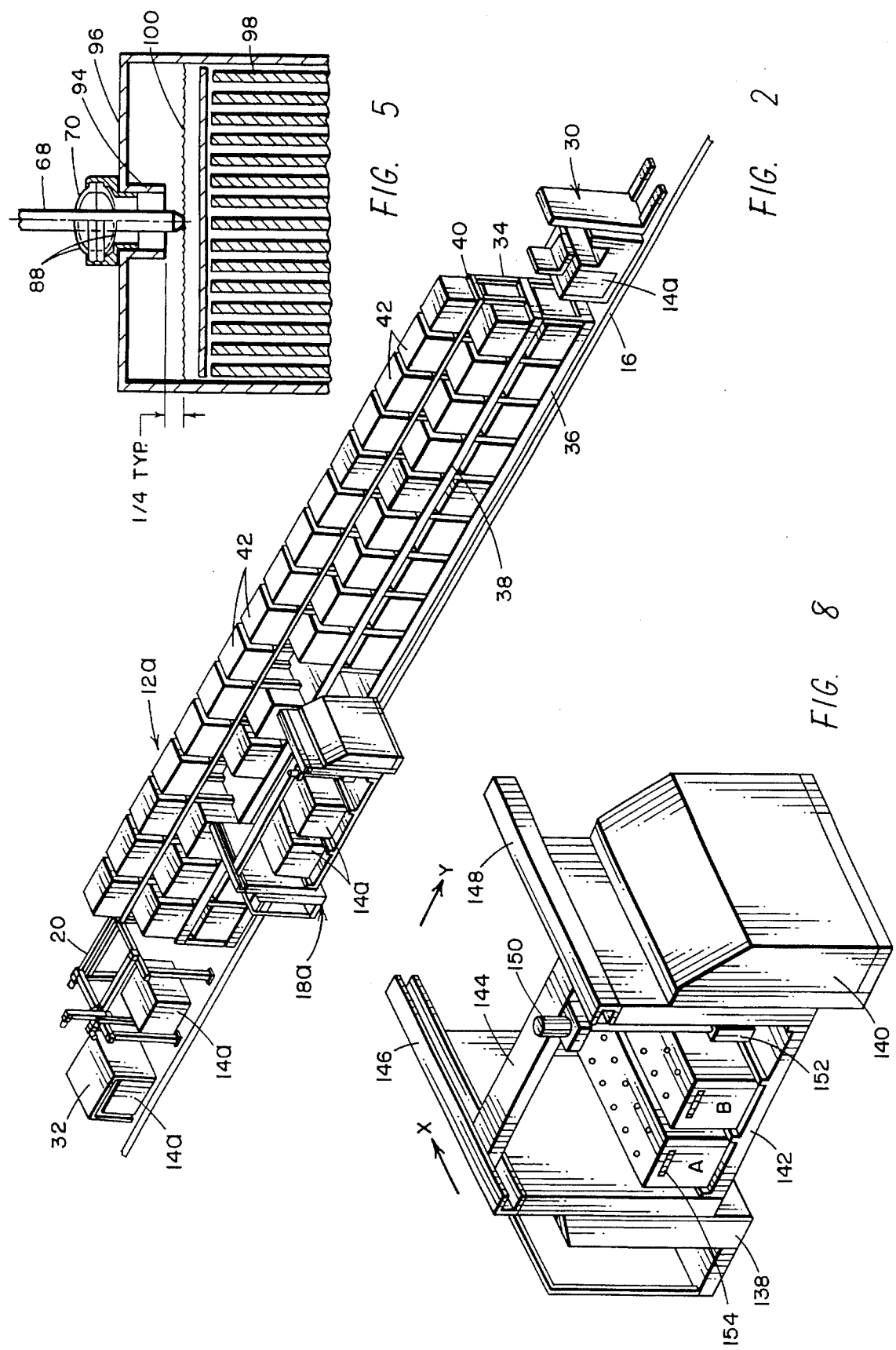

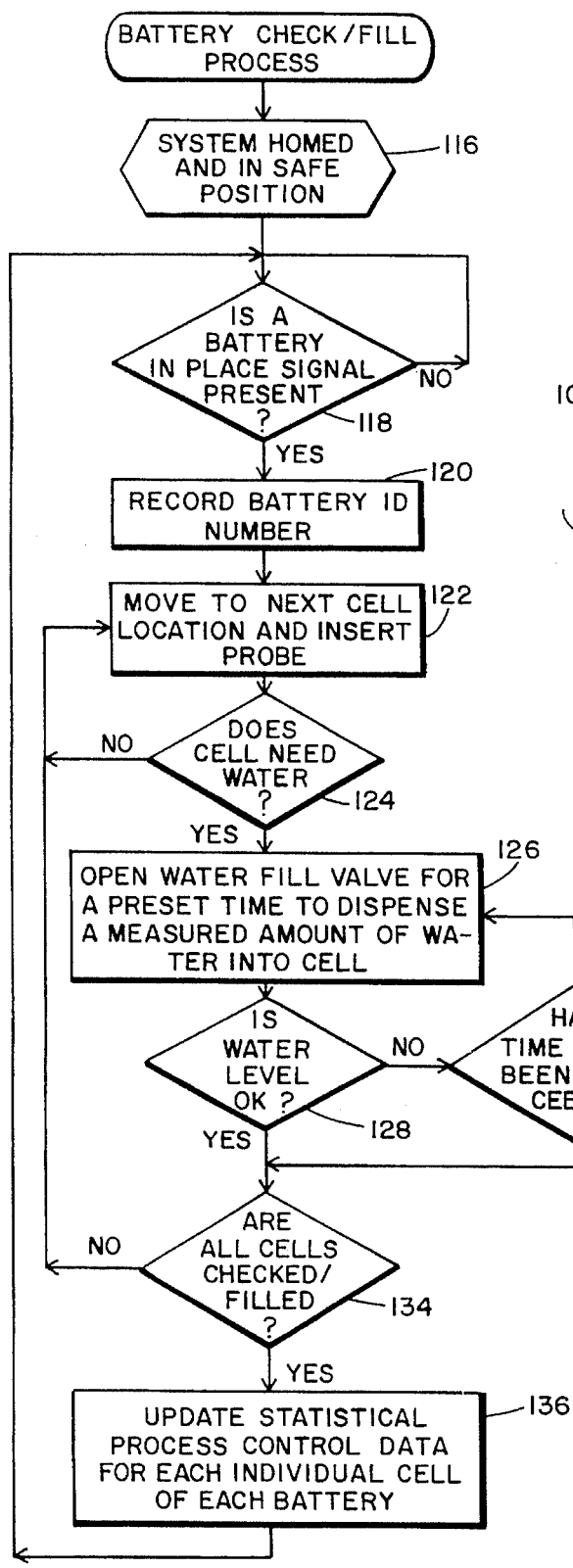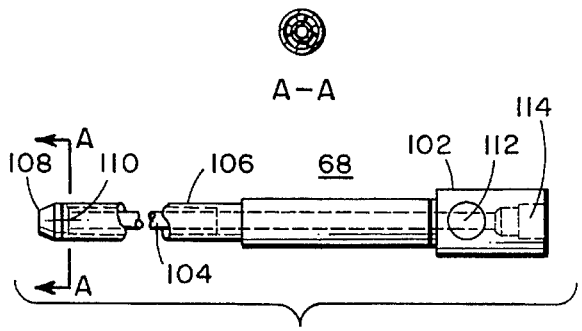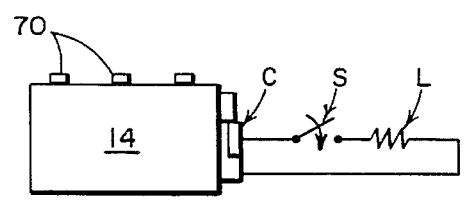
FIG. 6
FIG. 7
FIG. 7A

AUTOMATIC BATTERY MANAGEMENT SYSTEM

BACKGROUND OF THE INVENTION

The present invention relates to battery handling systems for batteries used in electrically propelled vehicles and, more particularly, to a battery management system for automatically transporting batteries between vehicles and battery charging stations and for checking battery operating characteristics during handling.

Battery powered vehicles such as forklift trucks and automated guided vehicles (AGV), commonly used in factory environments, utilize relatively large batteries for powering the vehicles. A typical battery for a forklift truck may weigh as much as 4,000 pounds and include 24 separate cells. Batteries for AGV's are typically used in pairs with each battery of the pair weighing approximately 800 pounds. In order to achieve efficient operation of such forklift trucks and AGV's, it is common practice to require that the batteries be removed from these vehicles for recharging. In a typical system, an operator would disconnect the batteries from the vehicle and use a separate transport vehicle for removing the batteries from the forklift truck or AGV and transporting the batteries to a battery charger station. The batteries are then connected to the charger and left in the station for a suitable recharge period. The operator then loads another set of batteries determined by FIFO onto the battery transport device and carries those batteries to the vehicle where they are then loaded on to the vehicle and again reconnected to allow the vehicle to be powered from the batteries. One method and apparatus for improving this process is shown in U.S. Pat. No. 4,795,358 which discloses a motion actuated connector apparatus for automatically connecting and disconnecting the batteries from the vehicle and from the charger station. Use of this connector apparatus simplifies the process of transporting batteries by eliminating the need for an operator to manually connect and disconnect battery terminals at the vehicle and at the charger station. However, the system disclosed in this patent does not obviate the need for an operator to manually move the battery between the vehicle and the charger station.

It is also desirable when a battery is charged to check the battery for water level in each cell. In general, the battery manufacturer specifies a particular water level for each cell which will prevent overflow during charging and which will assure that the individual plates within the cell are fully covered by the water-acid liquid within the cell. During the charging operation, if the battery cells are filled to too high a level, the water will tend to boil out of the cell creating an acid spill on top of the battery and on the charger apparatus. It is common practice for the operator to check the water level in the battery by individually opening the caps on the cells and looking inside the battery to determine whether the water is at the proper height. As a matter of practice, it has been found that the cells which are farthest from the operator position in a battery fail first because those cells are not easily inspected without the operator bending over the battery and stretching in order to actually physically check the water in those cells. For example, a typical battery may be 36 inches in length requiring that the operator stretch at least that far from one end in order to check the water level in the extreme end cells of the battery. Furthermore, even though the operator may check the water level in the battery and periodically fill the cells, there is no method for determining whether any cell is overheating and therefore needs to be replaced by simply monitoring the water level in any particular cell. Furthermore, it is not believed that there has been any prior attempt to uniquely identify each battery used in such electric vehicles for the purpose of anticipating any failure of a battery from the battery's charging history.

SUMMARY OF THE INVENTION

Among the several objects of the present invention may be noted the provision of an automated battery handling system; with total battery data collection and status reporting; the provision of an automated water check system; the provision of a battery cell cap which enables automatic water checking without allowing leakage of water from the battery; the provision of a method and apparatus for automatically tracking battery recharge and water filling cycles; and the provision of a system which automatically identifies defective batteries.

In one form of the present invention, there is provided a battery management system comprising a battery transfer cart, a row of racks with multiple battery charging stations and a robotic battery water check/fill system. The system is controlled by a personal computer which orchestrates the handling of the batteries, chargers, and water filler as well as tracks and operates on data recorded during the process and provides statistical process control of battery history such as water levels and specific gravity for each battery handled by the system. The system utilizes a one or more AGV or fork truck battery load/unload stations accessible by the battery transfer cart for loading and unloading batteries from a fork truck or AGV. The battery transfer cart is designed to access a battery or a pair of batteries from either an AGV or fork truck, load the batteries onto the transfer cart and transfer the batteries to either a storage location in a storage rack or to a battery charging station. If a battery charging station is available, the transfer cart will transfer the batteries directly to the battery charging station and insert them in the station for recharge. After completion of the charge cycle, the transfer cart will transfer the charged batteries to a battery storage location for cooling and the system will record that charged batteries are in storage.

In the case of an AGV, the vehicle is in communication via radio link or other system with the AGV/fork truck system controller and advises the AGV/fork truck system controller whenever the batteries on the AGV have discharged down to a predetermined level or have been used for a predetermined time. Upon receipt of the signal from the AGV that the batteries need recharging, the AGV/fork truck system controller directs the AGV/fork truck out of service and to return to the battery load/unload station and notifies the battery management system (BMS) controller that an AGV/fork truck is in route to the BMS. At the battery load/unload station, the BMS system controller directs the battery transfer cart to access the batteries on the AGV for removing them from the vehicle for transport to a charge station. In a preferred form, the battery transfer cart has capability of handling at least three batteries at one time and can therefore bring two fully charged batteries to the AGV before the discharged batteries on the AGV are unloaded. The process includes removing one of the discharged batteries from the AGV and replacing it with a charged battery from the battery transfer cart, then removing the second battery from the AGV and replacing it with the other charged battery from the transfer cart. This process eliminates the need for the battery transfer cart to move to the battery charge station and unload before picking up charged batteries to replace those removed from the AGV. In one form, the batteries may be transported to a water check/water fill system either prior to or after being transported to the battery charging station. At the battery water check station, the discharged or charged batteries are unloaded into the station and the system automatically checks each cell of each battery to determine whether the water level in the cell is at the factory recommended level. Water is added to each cell until the correct level is sensed. The amount of water added to each cell is recorded and stored in the system controller along with the identity of the battery and the particular cell for which water was added. This allows the BMS system controller to determine if a particular cell is using more than a normal amount of water and is therefore likely to fail. The probe used in the battery water check station can also be used to record specific gravity readings by cell to determine if the acid level in each cell is proper. The choice of whether to water fill before or after charging is a user option.

The same process as described above is also used for forklift trucks except that the forklift trucks are operated by an operator and the operator makes the decision when the fork truck's available battery power reaches a predetermined level. The operator may have radio contact with the BMS controller to alert the controller to arrival of the fork truck. When the operator positions the forklift truck in the battery load/unload station, the operator disconnects the battery and initiates the battery management system to remove the battery from the forklift truck. The transfer cart automatically moves to the load/unload station, positions itself to access the battery and pulls the battery from the truck. Preferably, the transfer cart carries with it a replacement battery so that immediately upon removing the discharged battery, the cart repositions itself and loads a freshly charged battery onto the forklift truck. The operator can then reconnect the battery to the truck and utilize the truck at the same time that the battery transfer cart is moving the discharged battery to the battery charge station. The transfer cart includes an onboard bar code reader which reads a bar code on the battery so that it can identify which battery has been positioned in the forklift truck and which battery has been removed from the truck. If the system includes an automatic water check/water fill station, the transfer cart will load the batteries into the water check station and the check station will then automatically check the water level in each cell of the battery. Any cell which requires water will be identified and the amount of water added to the cell stored in the system process controller as a record available for maintenance review. The water check station may also be provided with means for reading the specific gravity of the water in the battery cells. Once the water levels have been checked, the battery is automatically moved from the water check station by the transfer cart and carried to the battery charge station. In a preferred form, each of the batteries is provided with an automatic connector to enable the battery to be automatically connected into the battery charge station as it is unloaded from the battery transfer cart.

BRIEF DESCRIPTION OF THE DRAWINGS

For a better understanding of the present invention, reference may be had to the following detailed description taken in conjunction with the accompanying drawings in which:

FIG. 1 is a simplified mechanical layout of a battery management system in accordance with one form of the present invention for servicing automated guided vehicles;

FIG. 2 is a modified version of FIG. 1 for servicing fork lift trucks;

FIG. 3 is an enlarged view of the battery water check/fill station of FIG. 1;

FIGS. 4a and 4b are top and partial cross-sectional views, respectively, of a battery cap for use in the system of FIG. 3;

FIG. 5 is a cross-sectional view showing use of the cap of FIGS. 4a and 4b;

FIG. 6 is a partial cut-away view of a probe used in the system of FIG. 3;

FIG. 7 is a flow chart for operation of the system of FIG. 3;

FIG. 7a is a simplified view of battery electrical loading in the system of FIG. 3;

FIG. 8 is an enlarged view of the battery transport cart of FIG. 1;

DETAILED DESCRIPTION OF THE INVENTION

Figure 9:
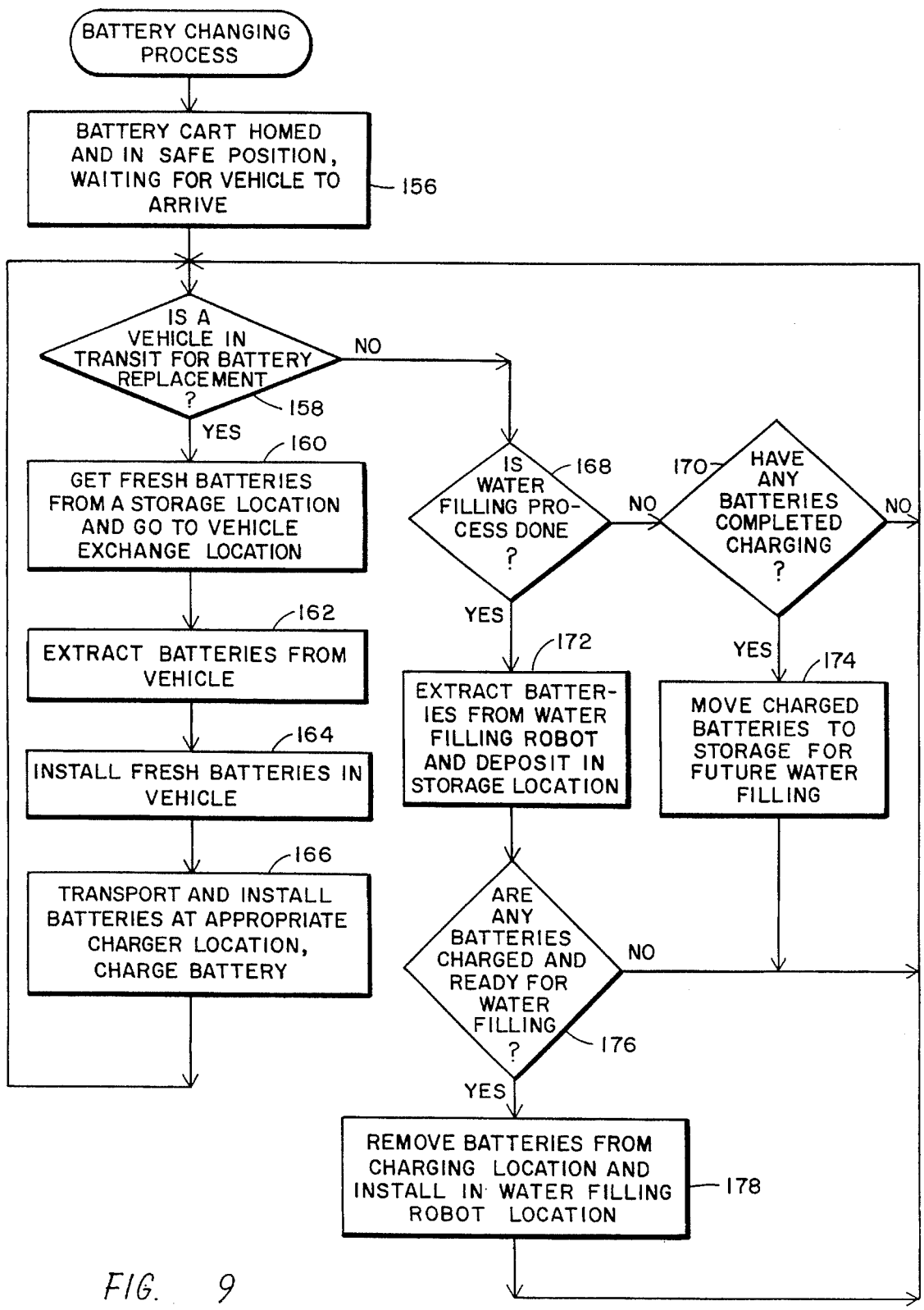
FIG. 9 is a flow chart of the operation of the system of FIG. 1.

Referring now to FIG. 1, there is shown a simplified block diagram of a battery management system in accordance with the present invention. The battery management system includes a two-tier battery storage rack 12 for storing multiple batteries 14. As will become apparent, at least some of the positions within the storage rack 12 are adapted to provide recharge capabilities for the batteries 14. Positioned adjacent to rack 12 is a guide way 16 which may be a set of rails adapted for supporting a battery transfer cart 18. Preferably, a water check/fill station 20 is positioned at one end of the rack 12 to allow the batteries 14 to be checked for water level in each cell of the battery and additional water added as needed. A programmable logic controller (PLC) such as an Allen Bradley SLC 500 or a GE/Fanuc 90-30 is incorporated into the transfer cart 18 for controlling the operation of the cart 18. Overall battery management system (BMS) operation is directed by a BMS controller 10, which may be a type 80486 CPU based personal computer, coupled to a host computer 21 representing the overall plant management system.

In the operation of the system of FIG. 1, a battery powered vehicle such as the illustrated AGV 22 is directed by host computer 21 to a predetermined battery load/unload station 23 adjacent the guide rail 16 so that the AGV is accessible by the battery transfer cart 18. The cart 18 initially loads two fully charged batteries from storage location 12 and then moves along the track 16 until it is aligned with the AGV 22 in such a position that one of the discharged batteries 14 from the AGV 22 can be transferred from the AGV to the battery transfer cart. Typically the batteries 14 are encased in an outer protective steel case and the transfer cart 18 includes a retraction device which utilizes an electromagnet/ or vacuum cup to pull the spent batteries from the AGV. A first one of the batteries 14 is removed from the AGV 22 and positioned in an empty space on the transfer cart 18. The transfer cart 18 then advances to a position where a charged battery 14 from the cart can be loaded into the available space in the AGV 22. After loading a charged battery in the AGV, a second discharged battery is then removed from the AGV and a second charged battery installed in the AGV in its place. The AGV is then available to return to service. The transfer cart moves the batteries 14 to an empty space in storage rack 12. The serial number of each battery, preferably encoded in a bar code strip on each battery and read by a conventional bar code reader on cart 18, is supplied to BMS controller 10 which tracks the batteries 14. The battery 14 is allowed to cool down before starting a charging cycle. For this purpose, the rack 12 may include temporary storage locations. Alternatively, the charging cycle may simply be delayed for some predetermined time. After an appropriate cool down period, the batteries can be moved to a charging station or, if in a charging station, the BMS controller will initiate charging. After the batteries have been charged, they can be moved to the battery water check/fill station 20 and loaded into the station. The check/fill operation is performed at user selectable intervals of charge cycles. Typically, the water is checked after every tenth charge. The cartesian robot within the station 20 sequentially checks each of the cells of each of the charged batteries 14 to determine the water level in each cell and to add water if water is needed. After the batteries have been checked at the water check/fill station, the transfer cart 18 removes the batteries from station 20 and either holds them awaiting arrival of another AGV for battery replacement or places the batteries into a holding area in rack 12 to allow other batteries to be transported to station 20. The transfer cart then acquires two recharged, cooled batteries and awaits the arrival of another AGV for battery replacement.

Referring now to FIG. 2, there is shown an alternate embodiment of the system of FIG. 1 which is particularly adapted for use with a forklift truck 30 of the type which uses a single large battery 14a rather than an AGV which typically employs two smaller batteries. The primary difference between the system of FIG. 1 and that of FIG. 2 is in the size and weight handling capability of the rack and battery transfer cart. As previously mentioned, batteries used in forklift trucks may weigh about 4,000 pounds whereas the smaller batteries used in automated guided vehicles (AGV) typically weigh about 800 pounds apiece. In FIG. 2, the forklift truck 30 is a manually operated vehicle requiring an operator to bring the truck 30 to a position adjacent the guide rails 16 so that the battery transfer cart 18a can move to a position for accessing the battery 14a on vehicle 30. For a normal change out of a single battery from truck 30, it is only necessary that the cart 18a be capable of carrying two batteries. Typically the cart will transport a fully charged battery to the battery load/unload station and remove the discharged battery from the truck 30 into an empty space on the cart. The cart will then advance into a position to load the charged battery into the forklift truck. The truck 30 is then immediately ready for use by the truck operator. The battery cart 18a can then transport the discharged battery to a location in rack 12a where the battery is held for a cooldown period. After a predetermined time, the battery is connected to one of the chargers 42 and re-charged. After the battery is charged, it is then picked up by cart 18a and positioned in the battery water check/fill station 20. Alternately, the cart 18a may transport the battery to a battery wash station 32 and insert the battery into the wash station to allow the battery to be washed of dust and other materials prior to transporting the battery into the water check/fill station 20. The cartesian robot incorporated in the battery water check/fill station 20 may be identical to the cartesian robot used in the embodiment of FIG. 1. The only change necessary is to revise the programming of the robot so that it can accurately locate the caps over each of the cells within the batteries 14a since the large batteries 14a have different cap positions than batteries 14.

It will be appreciated that the racks 12a are conventional types of storage racks formed by a plurality of vertical stanchions 34 supporting a lower shelf 36 and a middle shelf 38. The shelves 36 and 38 are particularly adapted to receive the batteries 14a. A smaller top shelf 40 also supported on the stanchions 34 is provided to support a plurality of battery chargers 42. The connection between the battery chargers and each of the batteries 14 or 14a is not illustrated in the figures. However, the battery chargers are conventional chargers of the type having a pair of leads which are adapted to connect to a connector which automatically mates with a corresponding connector on each of the batteries 14a when the batteries are pushed into one of the receiving slots on the rack 12a. An example of a preferred form of connector is shown in the aforementioned U.S. Pat. No. 4,795,358. A connector substantially identical to the connector in the U.S. Pat. No. '358 patent may be used in the AGV's 22 of FIG. 1. However, the forklift trucks are generally not adapted with these type of connectors and usually have a separate connector which must be disconnected by the vehicle operator prior to removing the battery 14a from the vehicle 30. Furthermore, the vehicle operator generally has to do a manual connection of the battery 14a to the vehicle when the batteries are replaced. However, the vehicles 30 could be retrofitted with a similar type of connector as that shown in the U.S. Pat. No. '358 patent to allow for automatic removal and installation of the batteries 14a into a forklift truck.

Turning now to FIG. 3, there is shown a view of one of the water check/fill stations 20. The station 20 essentially comprises a cartesian type robot 44 having a Y-axis drive motor 46, an X-axis drive motor 48 and a Z-axis drive motor 50. Cartesian type robots are well known in the art and are manufactured by various different manufacturers in different sizes depending upon the particular application. In the illustrative form of FIG. 3, the robot is supported on four vertical stanchions 52a–52d arranged at the four outer corners of the station 20. The rear most stanchions 52b and 52c are connected by horizontal brace 54 and the front stanchions 52a and 52d are connected by horizontal brace 54a (shown partially cutaway). The stanchions 52a and 52b are connected by a tubular member 56 while stanchions 52c and 52d are connected by a tubular member 58. The members 56 and 58 function as guides and supports for an X-axis cross-member 60 to which X-axis drive motor 48 is attached. Cross-member 60 supports Z-axis drive assembly 62.

The drive assembly 62 comprises a vertical support 64 with Z-axis drive motor 50 mounted to its upper end. A vertically (Z-axis) movable member 66 is coupled to support 64. A probe 68 is mounted on member 66 adjacent a lower end. The probe 68 is adapted for checking water levels in the individual cells of a battery 14 by being positioned over each cell cap 70 and then lowered into the cell to a predetermined depth by operation of the respective drive motors 46, 48 and 50.

As mentioned above, the cartesian robot 44 is a conventional robot of the type used in various manufacturing processes such as, for example, drilling of holes in work pieces or placement of components in a circuit board. In the illustrated embodiment, robot 44 employs a belt drive arrangement in which the motors 46, 48 and 50 are connected to drive belts which are concealed within the tubular members 56, 58, the cross-member 60 and the vertical support 64. For Y-axis motion, Y-axis motor 46 drives a shaft 72 extending through each member 56 and 58. Shaft 72 drives a pulley (not shown) in each member 56, 58 around which respective drive belts (not shown) are positioned. The respective drive belts extend the length of members 56, 58 around corresponding pulleys on opposite ends of members 56,58. Each end of cross-member 60 is attached to a respective one of the drive belts by connection means (not shown) extending from cross-member 60 into the interior of each member 56,58. Slots 74 in members 56,58 allow the connection means to carry cross-member 60 along the length of members 56,58 and thus position probe 68 in the Y-axis direction. Substantially identical drive designs are used to position probe 68 in the X-axis and Z-axis directions. It is not intended that the inventive system be limited to this type of drive arrangement since any cartesian robot of the illustrated type having sufficient accuracy to position probe 68 could be used in this system.

Turning now to FIGS. 4A and 4B, there are shown a top plan view and a side elevation view of a battery cap such as one of the battery caps 70 which is adapted for automatic water fill checking of each cell of the batteries 14 by insertion of the probe 68 through the battery cap. The outer portion 76 of the cap 70 is preferably formed of a plastic material which is generally non-reactive to the water/acid mixture within the battery. The lower portion 78 of the cap 70 is formed with a diameter specifically sized and adapted to slidingly engage a conventional opening through the outer wall of the battery 14. The bottom portion 78 is essentially a hollow cylindrical section. The upper portion 80 of cap 70 has an enlarged diameter which defines a bottom shoulder 82 which seats against the upper surface of battery 14 when the lower portion 78 is inserted in one of the battery apertures. Within the upper section 80, there is formed an internal groove 84 which is coaxial about a center line 86 passing axially through the cap 70. Upper portion 80 is essentially a cylindrical member similar to lower portion 78 but of a larger diameter. The opening through the upper portion 80 is closed by an elastic insert 88. In a preferred embodiment, the insert 88 comprises a pair of identical upper and lower segments 88a and 88b each having a circumscribing flange 90. When the flanges 90 are compressed together they can be fitted within the groove 84 to retain the assembly 88 within the cap 70. While the members 88a and 88b are substantially identical, in the assembled position they are in reverse orientation, i.e., the convex side of member 88a faces the convex side of member 88b. Each of the members 88a and 88b are cut with slits passing through the center axis 86. The slits are shown at 92 in FIG. 4A. Since the material of which the inserts 88a and 88b are formed is an elastic or rubber-like material, the convex or concave shape of the insert is maintained even though the slits 92 are formed and cut through the elastic material.

As will be appreciated from an analysis of FIGS. 4A and 4B, the shape of the elastomer members 88a and 88b is such that any liquid within the battery cell which splashes upward will be intercepted by the lower elastomer segment 88b and prevented from splashing out of the cap 70. However, even if the liquid is able to seep into the cap through the lower segment 88b, it will not have sufficient energy to splash upward against the segment 88a and will therefore be collected within the cap itself and allowed to drain back down into the battery cell. When it is desired to check the liquid level in the battery cell, the probe 68 can be inserted along the axis 86 passing through both the upper and lower elastomer segments 88a, 88b and entering into the liquid within the battery. When the probe 68 is withdrawn, the upper and lower cap segments 88a and 88b will return to their normal configuration again sealing the battery cap and preventing liquid from splashing out or dust from entering into the battery. Furthermore, while the liquid is prevented from splashing out of the cell, the elastomer material of the segments 88 can be displaced by pressure so that any accumulation of gas within the cell will be allowed to vent to atmosphere through the cap 70.

In a preferred form of the invention, the probe 68 is implemented as a pneumatic level sensing probe which employs a differential pressure sensor to detect the presence or absence of fluid. When the probe 68 is used in conjunction with the precision cartesian robot 44, height sensing can be achieved by determining when the probe touches the fluid level within each battery cell.

Referring first to FIG. 5, there is shown a cross-sectional view of a typical lead/acid battery cell in which the cap 70 has been installed into the cell aperture 94 with a probe 68 passing through the segments 88 to contact water or liquid within the cell. The lead/acid cell includes an outer casing 96 surrounding the cell and adapted for supporting a plurality of parallel arranged lead plates 98 submerged within the diluted acid mixture or liquid in the cell. The top of the liquid is preferably maintained at the level indicated at 100, which level is specifically designated for each cell by the cell manufacturer. The probe 68 is extended downward through the cap until the end of the probe engages the proper level of the electrolyte liquid in the cell at line 100.

To better understand the operation of the probe 68, reference is now made to FIG. 6 which illustrates one form of probe construction. The probe 68 has a manifold at 102 to which is connected a pair of coaxially arranged and longitudinally extending tubes 104 and 106. The outer tube 106 has a larger diameter than the inner tube 104 and defines a space between the inner and outer tube surfaces. At the end of the pair of tubes opposite the manifold 102, there is provided a nipple 108 which closes the space between the inner tube 104 and outer tube 106 but includes a central aperture connected to the inner tube 104. Just above the nipple 108 there is an aperture 110 passing through the outer tube 106. The space defined between the inner tube 104 and outer tube 106 is not coupled to the spacing within the inner tube 104. At the manifold end 102, there is provided a first opening 112 for connection of a water line. The opening 112 communicates with the spacing between the inner tube 104 and outer tube 106. At the end of the manifold 102 there is a second opening 114 which communicates with the hollow inner tube 104. When the probe is inserted into a battery cell, water can be added to the battery by injecting water through the opening 112 so that it flows down the probe around the inner tube 104 and within the outer tube 106 exiting out the aperture 110. The design provides for a relatively low flow of water so that as water is added to the cell there is very little disturbance of the water surface within the cell. Such disturbance is avoided since it is desirable to detect exactly when the surface of the water comes in contact with the probe.

The operation of the probe for detecting water level within the cell is based upon sensing of a differential pressure of air flowing through the center tube 104 and through a controlled constriction (not shown). More particularly, air at a regulated pressure is applied to two paths, one containing a fixed flow restriction and the other path being through the center tube 104 so that the flow restriction provided by the center tube 104 is a function of the gap from the end of the tube at nipple 108 to the surface of the fluid within the cell. The flow restriction caused by the gap or by contact of the tip 108 with the water surface affects a back pressure. When the differential pressure between the two flow paths exceeds a predetermined threshold, a pneumatic sensor (not shown) trips indicating fluid level has been detected. The pneumatic sensor is displaced from the probe 68 so that the sensor is not exposed to the acidic electrolyte and thus allows for non-contact remote sensing of the extremely caustic acid/water mixture within the battery cell. In order to assure that the sensor readings are accurate, the system software within BMS controller 10 operates on a sampling technique wherein a plurality of data readings are taken over a relatively short period of time to statistically determine whether or not the liquid level detection is accurate or whether there has been a false positive signal. Furthermore, the system preferably implements a detection scheme to determine whether or not there has been a probe failure. For example, while adding water the system may establish a time limit for liquid level detection. If liquid level is not sensed within the allotted time period, a fault indication is generated and an alarm or other indication of a failure is provided. The probe 68 is also tested by the system when it is in free space, i.e., not inserted within a battery cell, to insure that nothing has clogged the sensor path. The probe may then be moved to a test location where a predetermined volume of fluid is dispensed from the probe into a container. The amount of fluid dispensed and the time for dispensing it are recorded to determine if the probe is operating within acceptable limits. Once these tests have been utilized to confirm proper operation of probe 68, the probe can be inserted into a cell as shown in FIG. 5 to determine the level of fluid within the cell. Note that the probe can be easily inserted through the cap 70 by deflection of the slitted elastomeric portions of the insert 88 within the cap. While the outer tube 106 is particularly adapted for adding water, it can also be used to remove or sample the electrolyte by inserting probe 68 into the electrolyte and using a suction pump to draw electrolyte into the tube 106. This feature is useful for checking specific gravity and temperature of the electrolyte. For example, electrolyte is drawn into the probe 68 and carried to a conventional apparatus for checking temperature and specific gravity. After checking, the fluid can be returned to the cell.

To better understand the operation of the automatic battery check/fill process, reference is now made to FIG. 7 which illustrates a flow diagram of a computer implemented process within BMS controller 10 for controlling the battery water check fill station. In FIG. 7, the controller first checks to determine that the probe has been returned to a home location and is in a safe position so that it will not be in the path of a battery being inserted into the station. In this regard, the probe 68 which is under control of controller 10 for positioning, normally returns to a safe location retracted from the battery when all of the battery cells have been tested. The system first checks to determine if a battery is in position within the water check fill station, block 118. In implementing this check, it will be recognized that any number of sensors including mechanical sensors may be placed in the check station to determine if a battery has been positioned in the station. Preferably, the station includes mechanical stops for positioning the battery since the position is critical to the testing operation. More particularly, the controller 10 is programmed to identify the location of each cap 70 on each battery 14 by type of battery. Accordingly, when the battery is properly positioned within the water check station, the computer will then have an accurate location for positioning the probe over each cell. If a battery is not present in the station, the program simply loops until a battery is detected. Once the battery has been detected, the battery ID number is transmitted to the controller 10 from the transfer cart 18. As will be described hereinafter, the transfer cart 18 includes an optical reader (not shown) which is capable of reading identifying signals on batteries 14 as they are removed from and installed into the battery powered vehicles. The identifier may be a bar code or other type of identifier which is readily readable by mechanical means. The particular battery ID within the water check fill station is of importance to the system since it is desirable to keep track of particular cells as they pass through the station to determine if any cell is using excess water and thus indicating an overheat condition which may require that the cell be replaced. After the battery ID number has been recorded, block 120, the probe is moved to a first cell location and inserted into the cell through the cap 70, block 122. As previously described, the probe is inserted to a predetermined depth within a battery cell and air is applied to the probe to determine the level of liquid within the cell. If the differential pressure indicates that the cell does not need water, block 124, the program loops back to block 122 to move the probe to a next cell location. If the probe indicates that the cell does need water, a water valve is then opened, block 126, and a measured amount of water is injected into the cell. The air pressure is continued to be applied to the probe 68 so that the depth or level of water within the cell continues to be measured, block 128, until the water level is determined to be acceptable or until a predetermined time has passed, block 130. If the water level is determined to still be low and the allowable time limit has not been exceeded, the program allows a second measured amount of water to be dispensed into the cell and this process continues until the time limit has been exceeded or until the cell has received an adequate amount of water. If water is added under control of a system operator, the program may prompt the operator to allow water to be added rather than actuating an automatic water feed operation. If the water level is not satisfactory when the time limit has expired, the program steps to block 132 indicating a water fill process error. The process error is recorded in the system and an appropriate indicator provided so that the system can alert the system operator of the error. If the water level is acceptable, the program steps to block 134 checking to determine if all cells have been checked and filled with water. If the cells have not all been checked, the program loops back to block 122 and moves the probe 68 to the next cell location. After all cells have been checked, the program updates the statistical process control data (the "battery database") for each individual cell of each battery, block 136, and then loops back to block 118 waiting for another battery to be inserted into the station. The battery database is an important part of the controller 10 since it allows tracking of battery operation to detect early battery cell deterioration and allow replacement before other cells are damaged. The system operator can access the database and the database can be programmed to flag battery problems.

The probe 68 can also be used in load-testing of batteries 14. For example, and referring to FIG. 7A, the station 20 can include a battery connector C such as used in rack 12 to connect the batteries to a charger 42 except that the connector C connects to a controllable load L, i.e., controller 10, uses switch S to switch the load L in and out of connection to the battery. Probe 68 is replaced with a voltage probe which can then read the voltage at each cell under load to identify bad cells.

Turning now to FIG. 8, there is shown a somewhat more detailed view of the battery transfer cart 18 of a type which can be used with the present system. The battery transfer cart is preferably powered by an electrically driven hydraulic motor and runs on the rails 16 attached to the floor. Position control of the cart 18 is achieved by use of an incremental encoder of a type well known in the art. The cart is supported on each end by end members 138 and 140 which are connected together and adapted to ride on the rails 16. Between the end members 138 and 140, there is provided a vertically movable center portion 142 which can be lifted and lowered vertically by means of hydraulic motors or other means within the end members 138 and 140. The vertical movement of the center portion 142 allows the batteries 14 to be lifted to different levels for positioning on the storage rack or loading into the AGV or forklift trucks. A cross-member 144 is mounted on the center member 142 and rides in a pair of opposite channels 146 and 148. The cross-member 144 is driven by a motor (not shown) which moves the cross-member in the X direction as shown by the X arrow in FIG. 8. A second bracket and motor assembly 150 is mounted to cross-member 144 and adapted to drive in the Y direction along cross-member 144 in order to position the paddle 152. The paddle 152 is moved in the Y direction by the motor assembly 150 and in the X direction by the cross-member 144. As will be appreciated, the paddle 152 is used to push or pull the batteries from and into the transfer cart 18. In a preferred form, the batteries are generally enclosed in ferromagnetic cases and the paddle 152 includes an electromagnet or vacuum cup of sufficient strength to pull the batteries from the storage rack or from the associated vehicle in which they are used.

It will be noted that the transfer cart 18 of FIG. 8 is adapted specifically for AGV operation in which the smaller batteries 14 are used. In this regard, the cart has positions for three batteries, two of which are located at A and B in FIG. 8 and the other of which would be located in the slot now occupied by the paddle 152. The battery transfer cart also includes an optical reader positioned to read a battery identifier located on the batteries 14. The optical reader (not shown) may be attached adjacent the paddle 152 with the battery identifier then being a bar code or other label attached to the end of each of the batteries 14 as shown at 154 in FIG. 8. Thus, each time that a battery is transported by a transfer cart 18, the identifier of that battery can be read and the information stored in the BMS controller 10. While the battery transfer cart 18 is shown in one particular embodiment, it will be understood that various forms of transfer carts could be used for this application. The only constraint on the transfer cart is that it have facility for moving along the rail 16 or along a guide path which will allow the cart to move between a battery load/unload station and a storage rack or recharge station and a battery water check/fill station. It will also be recognized that if all of the batteries are loaded into the AGV's or forklift trucks at one level and all the racks are located at one level and if the battery water check/fill station is at the same level, then the need for a cart which can raise and lower the batteries may be unnecessary. Furthermore, other means of grasping a battery and removing it or loading it into a storage rack or vehicle can be used other than the magnetic implementation illustrated in FIG. 8. A battery transfer cart suitable for use as cart 18 may include electric or hydraulic motors for powering the cart under the control of an on-board programmable logic controller such as an Allen Bradley SLC 500 5/03 mounted in end member 140. The cart 18 may include an optical transmitter and receiver which can detect position of an AGV (using a reflector on the AGV) to correct for variation in position of the AGV. The cart's PLC can adjust cart position to correct for AGV position.

During the battery unload cycle, the battery is pushed off of the battery changing vehicle into a battery rack or onto the AGV. The presence of the battery and the position of the axes used to push the battery are monitored by the PLC. The logic of the PLC programming will not permit the cart to move unless the battery pusher has reached a predetermined location, and the presence of the battery was detected. The electromagnet is released and the battery pusher is retracted. The lack of presence of the battery is verified during the pusher retract portion of the cycle and the vehicle is inhibited from moving either horizontally or vertically until the battery pusher has fully retracted and the pusher retracted sensor is true.

During the battery load cycle, the battery is pulled on to the vehicle from the rack, water checker or AGV. The battery pusher extends until contact with the battery is verified by the battery presence sensor. When the battery is drawn onto the cart, the pusher retracts to a release point and stops, checks for battery presence, releases the electromagnet, then retracts fully.

The battery changing vehicle will include two through-beam sensors which will be positioned at each side of the cart to verify that the batteries are properly positioned on the cart prior to and during movement.

During loading, unloading, or transit, if any of the sensor conditions are not met, or if a hydraulic pressure surge is sensed before the cart reaches a predetermined location, an error condition is flagged and the error handling process is invoked.

Turning now to FIG. 9, there is shown a general flow chart for the operation of the battery management system of the present invention. The system initially assures that the battery transfer cart 18 has been homed or returned to a preset safe condition awaiting a vehicle to arrive for battery change, block 156. When the host computer 21 notifies BMS controller 10 that a vehicle is in transit for battery replacement, block 158, the transfer cart 18 is directed by controller 10 to get fresh batteries from a storage location and go to the vehicle battery load/unload station, block 160. When the vehicle arrives in the battery load/unload station, the cart extracts batteries from the vehicle and replaces them with fresh batteries, blocks 162 and 164 and then transports the used batteries to a battery charger location, block 166. The system then loops back waiting for another vehicle for battery replacement. Once batteries are in the battery recharge cycle, the BMS controller 10 periodically checks to determine if there are any batteries requiring water filling, i.e., whether there are any batteries that are in the water check/fill station 20. At block 168, the system determines if there are batteries for which the water filling process has been completed and if not then checks at block 170 to determine if any batteries have completed charging so that they can be moved to the water filling station. It should be noted here that it is generally desirable to bring the batteries into the charging station and complete the recharge prior to adding water to the battery cells. Thus, if the batteries have not been charged, the program loops back to wait at block 158. If water filling has been completed, the program instructs the transfer cart to extract the batteries from the water filling station 20 and transfer the filled battery to a location in the storage rack 20, block 172. If any batteries have completed the charging cycle, the program instructs the cart to move the charged batteries to the water check/fill station or to storage for future water filling depending upon the need for or availability of the water check/fill station, block 174. If no batteries are ready for water filling, block 176, the program simply loops back to block 158. If there are batteries charged and ready for water filling, the system instructs the transfer cart to remove the batteries from the charging location and install them in the water check/fill station, block 178.

Figure 10:
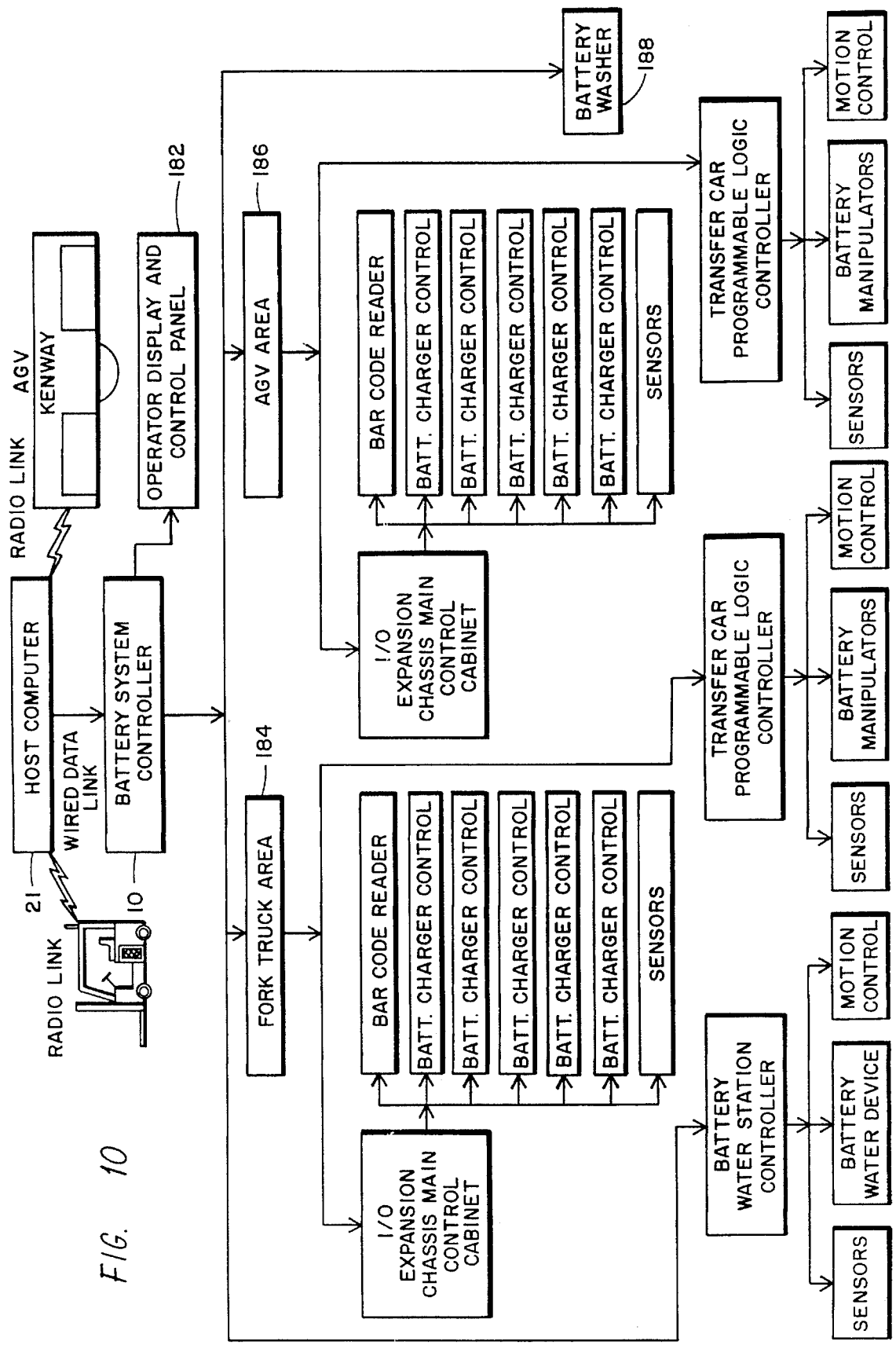
FIG. 10 is an overall functional diagram of the system of FIG. 1.

Turning now to FIG. 10, there is shown an overall system diagram of a battery management system for both a forklift truck and for an automated guided vehicle. The BMS controller 10 oversees the entire system and is in communication with each of the AGV's and forklift trucks in the system through the host computer 21. The AGV's and the forklift trucks can thereby notify the host computer 21 when they are returning to the battery replacement location so that the host computer can initiate the battery management system controller 10 to assure that fresh batteries are loaded on the cart 18 and the cart is waiting at the battery load/unload station when the vehicle arrives. The host computer 21 is generally interfaced to the battery system controller 10 which may be a personal computer type controller, such as a type 586 PC, coupled to an operator display and control panel 182 which may include a conventional keyboard and monitor. The battery system controller 10 provides the interface between the host computer 21 and the other components of the battery management system. Assuming that both forklift trucks and automated guided vehicles are used in a particular factory location, there may be two separate locations for battery management. One location indicated at 184 is for forklift trucks while another indication at 186 is for automated guided vehicles. The reason for the two separate locations is that the batteries for the two types of vehicles are different, both in size and weight. Accordingly, the size of the storage racks and the size of the transfer cart for each type of battery is different. The BMS controller 10 may also operate a battery washer as previously mentioned to enable the batteries to be washed so that any contaminating material such as dirt, grease or corrosion is not picked up by the probe 68 when it is inserted into each of the battery cells. The battery washer 188 may be the same washer for both size batteries since it is not necessary that the batteries precisely fit the washer but only that the washer be big enough to handle the largest size battery in the system. Each of the transfer carts 18, 18a for the AGV and the forklift area include their own programmable logic controller which interfaces with sensors such as the optical readers and position encoders and also interfaces with the battery manipulators such as the position of the paddle 152 along with the driving of the hydraulic motors that control motion of the carts. Each transfer cart also includes within the programmable logic controller an interface with the optical sensor for bar code reading as well as the other functions performed by the carts including accurate positioning for loading and unloading batteries. The system controller 10 in addition to its interface functions may also provide for data collection, host communication and cell supervision for monitoring of the water levels in each cell of each battery. The control panel 182 allows for manual operation in the event of system failure. The cart 18 may also be operated manually if the BMS controller 10 fails.

While the invention has been described in what is presently considered to be a preferred embodiment, various modifications and improvements may become apparent to those skilled in the art. It is intended therefore that the invention not be limited to the specific disclosed embodiment but be interpreted within the full spirit and scope of the appended claims.

What is claimed is:

1. A system for automatic loading, unloading and charging of rechargeable batteries used in battery electric traction motor powered vehicles, the system comprising:

a battery recharge station;

a battery load and unload station adapted for positioning a battery powered vehicle in a preselected position therein;

a programmable battery transport apparatus programmed for automatically removing discharged batteries from the vehicle, transporting the discharged batteries to a battery recharge station, unloading the discharged batteries into the recharge station, retrieving charged batteries from the recharge station, transporting the charged batteries to the vehicle and loading the charged batteries onto the vehicle;

a battery water check station, the transport apparatus being programmed to transport batteries from the battery charging station to the water check station, load the charged batteries into the water check station and unload the batteries from the water check station upon completion of a check of the water level in each of the batteries; the water check station including means for checking the water level in each cell of each of the batteries, said checking means comprising an elongate probe adapted for insertion into each cell of the battery through a cap positioned on the cell; and the water check station including a programmable robot arm operable for precisely positioning the probe in alignment with the cap, and effecting insertion and withdrawal of the probe into and from each battery cell.

2. The system of claim 1 and including a battery storage station for temporary storage of batteries, the transport apparatus being programmed to store charged batteries in the storage station prior to transporting the batteries to the vehicle.

3. The system of claim 1 wherein said checking means includes means for adding water to each cell until each cell is filled to an optimum level.

4. The system of claim 1 wherein the cap comprises a pair of elastomeric members having oppositely facing concave portions, each of the concave portions including a centrally positioned cut for allowing passage therethrough of the probe.

5. The system of claim 4 wherein each of the elastomeric members have annular mating flanges, the cap including a rigid outer structure capturing the flanges of the elastomeric members in abutting relationship, the outer structure being adapted for mating engagement with an opening into each cell.

6. The system of claim 5 and including control means for controlling the operation of the system, the control means including means for tracking the recharge cycle of each of the batteries and the water usage of each cell of each of the batteries.

7. The system of claim 6 wherein each of the batteries is identified with a bar code label and said tracking means includes means for reading the bar code label on each battery each time the battery is moved by the transport apparatus.

8. The system of claim 1 and including means for automatically electrically connecting and disconnecting the batteries to and from the vehicle, respectively, in response to the respective steps of loading and removing the batteries at the vehicle.

9. The system of claim 1 and including means in the battery recharge station for automatic electrical connection and disconnection of the batteries to and from the station.

10. A system for automatic loading, unloading and charging of rechargeable batteries used in battery electric traction motor powered vehicles, the system comprising:

a battery recharge station;

a battery load and unload station adapted for positioning a battery powered vehicle in a preselected position therein;

a programmable battery transport apparatus programmed for automatically removing discharged batteries from the vehicle, transporting the discharged batteries to a battery recharge station, unloading the discharged batteries into the recharge station, retrieving charged batteries from the recharge station, transporting the charged batteries to the vehicle and loading the charged batteries onto the vehicle; and a battery management system for accumulating data indicative of recharge history for each of the batteries, including data indicative of water added to each cell of each of the batteries.

11. The system of claim 10 and including means for load-testing each of the batteries after charging.

12. The system of claim 10 and including means for determining specific gravity of electrolyte in each cell of the batteries.

13. A battery cap for covering each cell of a battery comprising a pair of elastomeric members having oppositely facing concave portions, each of the concave portions including diametrical slits for allowing passage therethrough of an elongate probe.

14. The battery cap of claim 13 wherein each of the elastomeric members have annular mating flanges, the cap including a rigid outer structure capturing the flanges of the elastomeric members in abutting relationship, the outer structure being adapted for mating engagement with an opening into each cell.

* * * * *